(12) United States Patent
Tezock

(10) Patent No.: US 7,591,985 B2
(45) Date of Patent: Sep. 22, 2009

(54) METHOD FOR PURIFYING GERMANIUM HYDRIDES

(75) Inventor: Mathias Tezock, Hillsborough, NJ (US)

(73) Assignee: Metaloid Precursors, Inc., Terrell, TX (US)

( * ) Notice: Subject to any disclaimer, the term of this patent is extended or adjusted under 35 U.S.C. 154(b) by 181 days.

(21) Appl. No.: 11/756,114

(22) Filed: May 31, 2007

(65) Prior Publication Data

US 2008/0299037 A1  Dec. 4, 2008

(51) Int. Cl.
*B01D 53/34* (2006.01)
*C01B 6/06* (2006.01)

(52) U.S. Cl. .............. 423/210; 423/219; 423/220; 423/225; 423/235; 423/645; 95/290; 55/DIG. 15

(58) Field of Classification Search ............. 423/210, 423/219, 220, 225, 235, 645; 95/290; 55/DIG. 15
See application file for complete search history.

(56) References Cited

U.S. PATENT DOCUMENTS

| | | | |
|---|---|---|---|
| 2,882,243 A | 4/1959 | Milton | |
| 2,882,244 A | 4/1959 | Milton | |
| 2,988,427 A * | 6/1961 | Schmidt et al. | 423/347 |
| 3,102,013 A | 8/1963 | Skarstrom | |
| 3,176,444 A | 4/1965 | Kiyonaga | |
| 3,221,476 A | 12/1965 | Meyer | |
| 3,323,288 A | 6/1967 | Cheung et al. | |
| 3,430,418 A | 3/1969 | Wagner | |
| 3,619,984 A | 11/1971 | Domine et al. | |
| 3,720,042 A | 3/1973 | Simonet | |
| 3,751,878 A | 8/1973 | Collins | |
| 3,788,037 A | 1/1974 | Shell et al. | |
| 3,957,463 A | 5/1976 | Drissel et al. | |
| 3,967,464 A | 7/1976 | Cormier et al. | |
| 4,077,779 A | 3/1978 | Sircar et al. | |
| 4,190,424 A | 2/1980 | Armond et al. | |
| 4,668,502 A | 5/1987 | Russotti | |
| 4,770,676 A | 9/1988 | Sircar et al. | |
| 6,461,411 B1 * | 10/2002 | Watanabe et al. | 95/116 |

(Continued)

OTHER PUBLICATIONS

Piper, T.S., et al; "The Preparation of Germane", J. Inorg. Nucl. Chem. 1957, vol. 4, pp. 22 and 23. (1957).

(Continued)

*Primary Examiner*—Timothy C Vanoy
(74) *Attorney, Agent, or Firm*—David W. Carstens; Chad E. Walter; Charstens & Cahoon, LLP

(57) ABSTRACT

In one aspect, the crude gas is contacted with a cold caustic solution to reduce levels of carbon dioxide and water. The partially purified gas is chilled in direct-contact with a hydrogen refrigerant to induce homogenous condensation of water impurity. Liquid and ice particles formed by lower temperatures are removed across an aerosol phase separating medium to produce a cooled and partially purified gas mixture which is further dried and de-carbonated across a zeolitic molecular sieve adsorbent to achieve very low concentrations of moisture and carbon dioxide in the bulk gas. In one aspect, the purified gas mixture obtained is partially liquefied, phase-separated and distilled to obtain germanium hydride, digermanium hexahydride and hydrogen gas as products. A portion of the hydrogen product can be compressed, chilled and re-used as a direct-contact refrigerant in the purification process.

13 Claims, 1 Drawing Sheet

U.S. PATENT DOCUMENTS

| | | | |
|---|---|---|---|
| 6,670,544 | B2 | 12/2003 | Kibbel et al. |
| 6,733,734 | B2* | 5/2004 | Watanabe et al. ............ 423/219 |
| 7,067,091 | B2* | 6/2006 | Teshigawara et al. ....... 423/210 |
| 7,087,102 | B2 | 8/2006 | Withers, Jr. et al. |
| 7,294,320 | B2* | 11/2007 | Pettibone .................... 423/210 |
| 2002/0100366 | A1* | 8/2002 | Watanabe et al. ............. 95/116 |
| 2003/0092570 | A1* | 5/2003 | Teshigawara et al. ....... 502/407 |
| 2003/0097929 | A1* | 5/2003 | Watanabe et al. .............. 95/90 |
| 2005/0120877 | A1* | 6/2005 | Wu et al. ...................... 95/117 |
| 2005/0175520 | A1* | 8/2005 | Shioya et al. ............... 423/210 |
| 2006/0188420 | A1* | 8/2006 | Alvarez et al. .............. 423/210 |

OTHER PUBLICATIONS

Griffiths James E. "Monogermanes—Their Synthesis and Properties", Inorganic Chemistry, pgs. 375-377 (1963).

Srivastava, T.N., et al.; "Derivatives of Monogermane Part II. Preparation and Properties of Germyl Pseudohalides and Related Compounds", Canadian Journal of Chemistry, vol. 40, pp. 739-744 (1962).

Wang, Francis T., et al.; "A Kinetic Study of the Intermediates in the Hydrolysis of the Hydroborate Ion", Inorganic Chemistry, vol. 11 No. 8 pgs. 1933-1941 (1972).

Kreevoy, M.M., et al. "H2BH3 as an Intermediate in Tetrahydridoborate Hydrolysis", Journal of the American Chemical Society / 94:18 (Sep. 6, 1972).

Gardiner, John A., et al., "Kinetics of the Stepwise Hydrolysis of Tetrahydroborate Ion", Journal of the American Chemical Society / 87:8 pp. 1692-1699 (Apr. 20, 1965).

Keller II, George E.; "Adsorption: Building Upon a Solid Foundation"Chemical Engineering Progress, pp. 56-67 (Oct. 1995).

Said, Khalid, et al.; "Design, Fabrication, and Analysis of Crystalline Si-SiGe Heterostructure Thin-Film Solar Cells" IEEE Transactions on Electron Devices, vol. 46, No. 10 pp. 2103-2110 (Oct. 1999).

Drake, J.E., et al; "Hydrides of Germanium", J. Chem. Soc., (1962), pp. 2807-2813.

Jolly, William L.; "The Prepareation of the Volatile Hydrides of Groups IV-A and V-A by Means of Aqueous Hydroborate", J. Amer. Chem. Soc., (Jan. 20, 1961), pp. 335-337.

Macklen, E.D.; "Preparation of Germane. Part I. Reaction between Lithium Aluminum Hydride and Germanium Tetrachloride", J. Chem. Soc., (1959), pp. 1984-1988.

Macklen, E.D.; "Preparation of Germane. Part II. Reaction between Sodium Borohydride and Germanium Tetrachloride", J. Chem. Soc., (1959), pp. 1989-1992.

* cited by examiner

METHOD FOR PURIFYING GERMANIUM HYDRIDES

BACKGROUND TO THE INVENTION

1. Field of the Invention

This invention relates generally to the purification of germanium hydrides through selective absorption, partial condensation, freezing, phase separation and adsorption of impurities, followed by fractionating the purified gas mixture; and more specifically to such sequential operations that are designed for removing water and carbon dioxide from mixtures of hydrogen and germanium hydrides before fractionating the dry and de-carbonated gas mixture into substantially pure components.

2. Description of the Related Art

In the last half-century, the electronic materials industry has developed effective techniques of chemical vapor deposition, which include metalorganic vapor phase epitaxy, hydride vapor phase epitaxy, metalorganic molecular beam epitaxy and atomic layer deposition. These technologies consume metalloid compounds that include the ultra pure hydrides of silicon, germanium, phosphorous and boron in an ambient gas such as hydrogen, to make diverse structures that include molecular units, crystals, surfaces, thin films and alloys such as silicon-germanium. Germanium based structures find wide applications in high-performance microelectronic devices, such as diodes, transistors, detectors, thin-film photovoltaic cells and the like. By virtue of lower deposition temperatures and ease of treating decomposition by-product hydrogen in vent systems, germanium hydrides present a more compelling business case to foundry users than the halides of germanium. Not surprisingly, recent years have witnessed a growing demand for ultra pure germane and digermane, with 10 ppm or less of impurities, driven mainly by consumption in silicon-germanium alloys for microelectronic devices and amorphous thin films for multi-function photovoltaic cells. On the one hand, silicon-germanium alloys find applications in heterojunction bipolar transistors or as strain-inducing layers for complementary metal oxide semiconductor transistors in integrated circuits. This silicon-germanium technology enables higher processor speeds and a flexibility to tune band gaps in low-cost electronic processors to meet the specific bandwidth needs of high frequency optical networking, wireless and other communication applications with greater efficacy than chips made with silicon only. On the other hand, germanium is an invaluable component of multi-junction photovoltaic cells, each comprising an ordered assembly of different semiconducting thin-film junctions, each junction generating a photovoltaic current in response to specific frequencies of incident sun light. The most used thin-film material silicon, for example generates a photovoltaic current from incident sun light over a comparatively small portion of the solar spectrum; its lowest absorption is in the infrared, which is where germanium with its small band gap provides a stronger photovoltaic response, converting incident infrared photons into electric current. In addition to silicon and germanium layers, multi-junction photovoltaic cells have evolved to include layers of gallium arsenide for converting blue light and indium phosphide for converting incident ultraviolet frequencies into electric currents. A multi-junction assembly of these material layers provides a very large capture cross-section for incident sun light, leading to photovoltaic cells with higher conversion efficiencies or base currents than are currently obtainable from cells based on silicon only.

Methods for synthesizing germanium hydride gases are long known in the art, including general considerations of raw materials, their physical and chemical properties and the impact of reactants, pH and temperature on yields. The methods include the chemical reduction of germanium oxide in acidic media or germanium halide in alkaline media to produce germanium hydrides and hydrogen gas mixtures. Typical reducing agents include the hydrides of lithium, sodium and magnesium, the borohydrides of lithium, sodium and potassium and as well as the aluminum hydrides of lithium and sodium. Another chemical method involves the reduction of germanium halide in a heated solution of a reducing agent in tetrahydrofuran solvent. Illustrative of the early chemical syntheses prior art for producing germanium hydrides are those of T. S. Piper et al, (1957); Macklen (1959); T. N. Srivastava et al (1962); W. L. Jolly (1961) and J. E. Drake et al (1962). Of the early known art, Drake J. E. et al (1962) obtained about 70% yields of germanium hydride by acidifying alkaline solutions of alkali metal borohydride containing germanium oxide in various concentrations with or without a polyglycol additive. The reagents used (germanium oxide-$GeO_2$, potassium hydroxide—KOH, sulfuric acid-$H_2SO_4$, sodium borohydride—$NaBH_4$ and water) were further investigated by Russotti in U.S. Pat. No. 4,668,502 and shown to provide yields in excess of 96% germanium hydride for feed ratios of 6:1 $NaBH_4$ to 0.13M $GeO_2$ and 1:2 $GeO_2$ to 1.5-3.0M $H_2SO_4$. Russotti also teaches that side reactions occur, especially with the use of more concentrated acid at warmer temperatures to produce digermanium hexahydride ($Ge_2H_6$). The presence of excess acid, for example $H_2SO_4$, in aqueous solution is well-known in the art to catalyze the hydrolysis of excess $NaBH_4$ into hydrogen and sodium tetrahydroxoborate—$Na[B(OH)_4]$. The hydrolysis of $NaBH_4$, represented in scientific notation as $NaBH_4 + 4H_2O \leftrightarrows Na[B(OH)_4] + 4H_2$ is spontaneous and exothermic with a theoretical heat output of −245 kJ/mol. Typical studies of the kinetics of $NaBH_4$ hydrolysis are those of Gardiner et al (1965), Wang et al (1972), Kreevoy et al (1972). The overall heat output in underlying reactions, if uncontrolled, is sufficient to raise the temperature of the aqueous solution, thereby raising the vapor pressure of water in product gases and as well as that of other atmospheric gases dissolved in aqueous media. Such dissolved gases include but are not limited to carbon dioxide, nitrogen, oxygen and argon. These solution gases, though small in quantity, add to hydrogen and germanium hydrides in the product gas mixture bubbled off aqueous reactions in chemical reduction methods employing aqueous reactants. U.S. Pat. No. 5,158,658 to Ayers teaches an electrochemical method for synthesizing germanium hydride wherein the product is generated at a germanium cathode of a 1N NaOH electrolyte with a cadmium or molybdenum anode. The exemplified yield of 30% $GeH_4$ at the cathode is clearly lower than can be obtained from the basic chemical reduction method of Drake (1962).

Regardless of synthesis method used, the hydride gas mixture must be refined to obtain germanium hydrides in ultra pure form, typically over 99.999% pure or five 9s, which are generally stated as "grade 5.0" to meet the specification for electronic device manufacturing. Techniques for selectively removing moisture and carbon dioxide from gas streams include but are not limited to physical absorption, chemical absorption, partial condensation and phase separation, selective freezing in reversing heat exchangers, selective permeation, adsorption and distillation.

Since the teachings in U.S. Pat. Nos. 2,882,243 and 2,882,244 to Robert M. Milton that electrostatically bound and charge compensating cations in aluminosilicate crystals are substitutable to obtain evenly porous and internally charged media that have molecular sieving properties, application of zeolitic molecular sieves or zeolites in gas purification, particularly as dewatering and de-carbonating media for a wide range of fluids even at very low concentrations, are now taught in the art (Scott M. A. et al, *Handbook of Zeolite Science and Technology*, Dekker, 2003) and exemplified in commercial practice on a world wide scale. Examples include adsorption systems for removing water and carbon dioxide from (a) natural gas to raise its calorific value, (b) commercial hydrogen made by steam-methane reforming, (c) compressed air upstream of cryogenic distillation in industrial air separation, (d) krypton, xenon and neon enriched gas streams recovered from air following the catalytic conversion of trace hydrocarbons and oxygen impurities into carbon dioxide and water and from (e) intermediates of some flavor-organic compounds. Illustrative examples describing the use of zeolites to remove contaminants, notably water and carbon dioxide from hydrogen gas enriched streams to obtain high purity hydrogen are those described in U.S. Pat. Nos. 3,788,037; 3,102,013; 3,176,444; 3,221,476; 3,323,288; 3,430,418; 3,619,984; 3,720,042; 3,751,878; 3,957,463; 4,077,779. These methods teach the use of step changes in temperature, in pressure or in the concentration of gas flowing through the media to accomplish adsorption and desorption of water and/or carbon dioxide molecules from zeolites.

The most common group of zeolites is type A (3A, 4A and 5A), having the same crystalline structure but different cations on unit surfaces which produce different pore sizes. At ambient temperature and lower, the affinity for water and carbon dioxide molecules by molecular sieves type A is so strong that temperatures in excess of 300° C. may be needed to desorb water molecules fully. The desorption sequence known as regeneration enables adsorbate (water and carbon dioxide) molecules to be thermally driven off the zeolite surface, rendering the latter re-usable as a purification medium at lower temperatures. While the strong affinity for water and other polar molecules renders molecular sieves costly in thermal energy and regeneration time, synthetic zeolites, especially types A and 13X in 4-8 mesh sizes are the economic method of choice for removing moisture contaminant in low concentrations, typically under 1% by volume of the bulk gas, where high levels of purity are required in the product gas.

More recently, U.S. Pat. No. 7,087,102 B2 to Withers Jr. et al, discloses a process which advantageously employs the Skarstrom adsorption cascade (after U.S. Pat. No. 3,102,013 to Charles Skarstrom) under a pressure envelope up to 200 psig to purify mixtures of germanium hydrides, hydrogen and air impurities synthesized by the chemical reduction method, wherein water and carbon dioxide are selectively adsorbed in a first bed of molecular sieves selected from type 4A or other functionally similar adsorbent having an effective pore size greater than 4 angstroms, to produce a partially purified germane fluid. The partially purified germane fluid is then passed across a second molecular sieve selected from type 5A, 13X or other functionally similar adsorbents but having an effective pore size greater than 4 angstroms to adsorb heavier (than germanium hydride) germanium-containing compounds such as digermane ($Ge_2H_6$) and trigermane ($Ge_3H_8$), to obtain a hydrogen-enriched purified $GeH_4$ fluid which is then separable by conventional methods. The disclosed method produces a germanium hydride product containing less than 1 vol. % of germanium-containing impurities.

Adsorption is an exothermic process and the heat liberated is similar in effect to the heat of condensation. Zeolitic molecular sieves have low specific heat capacities and the heat liberated in adsorbing water and carbon dioxide tends to warm up the adsorbent in direct proportion to the amount of adsorbate removed from the flowing gas stream. Sensible heating of zeolitic molecular sieves is known in the art to diminish separation efficiency at a fixed operating pressure. To compensate for the temperature-induced reduction in separation efficiency, higher operating pressures, greater volume of adsorbent per unit mass of gas to be purified, multiple zeolite adsorption stages or other effective combinations of these design parameters may be needed, to augment the overall adsorptive capacity at given operating conditions of impurity levels, gas flow rate, pressure and temperature. For practical reasons, a fluid purification column packed with zeolitic molecular sieves may itself be surrounded by external heating elements and shrouded beneath high capacity insulation to assist the regeneration sequence during which the column and its contents are heated to temperatures generally in excess of 180° C. but no more than circa 300° C. to drive off adsorbate withheld in the preceding purification sequence. In typical setups therefore, the flexibility to cool the adsorbent-containing vessel externally during gas purification is limited but can be incorporated at greater expense. The use of higher operating pressures to overcome temperature-induced deficiencies increases plant operating cost and escalates the potential hazard of toxic gas leaks. The use of greater adsorbent volume than is needed increases capital and operating costs. This detrimental effect of the heat of adsorption is unavoidable in the prior art wherein a significant portion of the moisture and carbon dioxide arising from the aqueous reactions is removed by adsorption from crude hydride gas. A further drawback of U.S. Pat. No. 7,087,102 is the adsorption of valuable digermane —$Ge_2H_6$ in the second adsorption step and its subsequent loss in an incinerating purge at temperatures up to 300° C. The safe disposal of desorbed digermane $Ge_2H_6$ in the prior art typified by U.S. Pat. No. 7,087,102 on a regular basis on commercial scale necessitates an elaborate scrubbing system to abate the hazard of vent streams released into the atmosphere, especially for germanium hydrides with a low exposure limit of 0.2 ppm in air. Alternatively, it may be required to chill the reactants, as taught in U.S. Pat. No. 4,668,502 to achieve lower yields of digermane. These challenges render the synthesis and purification of germanium hydrides to meet electronic specifications rather difficult and expensive. Not surprisingly, ultra pure germanium hydride in May 2007 costs upwards of $120 per gram when sourced in small quantities from mainstream catalogue retailers. An urgent need therefore exists in the art for the development of more cost-effective purification methods, which may be advantageously integrated to the high yielding synthesis method of Drake (1962).

SUMMARY OF THE INVENTION

An object of one embodiment of the present invention is to provide a process wherein an impure germanium hydride gas mixture synthesized by any of the known chemical reduction methods is partially dehumidified and its carbon dioxide content lowered through direct-contact with the cold aqueous solution of an alkali metal hydroxide in a scrubbing tower.

Another objective of one embodiment of this invention is to abruptly chill the partially purified hydride gas stream through direct-contact with hydrogen gas refrigerant at lower temperatures, thus condensing water and freezing water droplets in the hydride gas mixture but without introducing the metallic walls of conventional heat transfer devices which impose an undesirable thermal resistance and can be subject to corrosion and deposition.

A further objective of one embodiment is to separate the liquid and solid phases formed upon abruptly chilling the hydride gas by passing the said gas across an aerosol coalescing and phase separating medium.

In one aspect of this invention, there is provided a method for obtaining high purity germanium hydride ($GeH_4$) and digermanium hexahydride ($Ge_2H_6$) from a crude hydride gas mixture laden with impurities, comprising the steps of (i) cooling, dehumidifying and partially de-carbonating the impure hydride gas through scrubbing with a cold caustic solution, withdrawing therefrom a first purified hydride gas, (ii) lowering the temperature of the first purified hydride gas through direct-contact chilling with hydrogen refrigerant to further condense water vapor therein to obtain an aerosol of water droplets and ice particles dispersed in a bulk hydride gas continuous phase, (iii) removing the liquid and ice particles formed by passing the aerosol across a coalescing and filtration medium, and withdrawing therefrom a second purified hydride gas; (iv) passing the second purified hydride gas mixture through an adsorption means to remove residues of water and carbon dioxide, to obtain a dry hydride gas, (v) chilling the dry hydride gas to cryogenic temperatures to preferentially liquefy germanium hydrides, phase-separate and fractionate the liquid mixture obtained into high purity germanium hydride $GeH_4$, digermanium hexahydride $Ge_2H_6$ and hydrogen gas as products. Another objective of one embodiment of this invention to recover digermane ($Ge_2H_6$) as a co-product, thereby avoiding the loss of a valuable by-product.

In yet another embodiment of this invention, the superior thermal capacity of hydrogen gas is harnessed, wherein part of the purified hydrogen product is compressed, refrigerated to below −50° C. and injected into the process upstream in step (ii) to chill by direct-contact the impure hydride gas, which method advantageously escalates the overall heat transfer rate. The above as well as additional features and advantages of the present invention will become apparent in the following written detailed description.

BRIEF DESCRIPTION OF THE DRAWING

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION OF THE INVENTION

Figure 1:
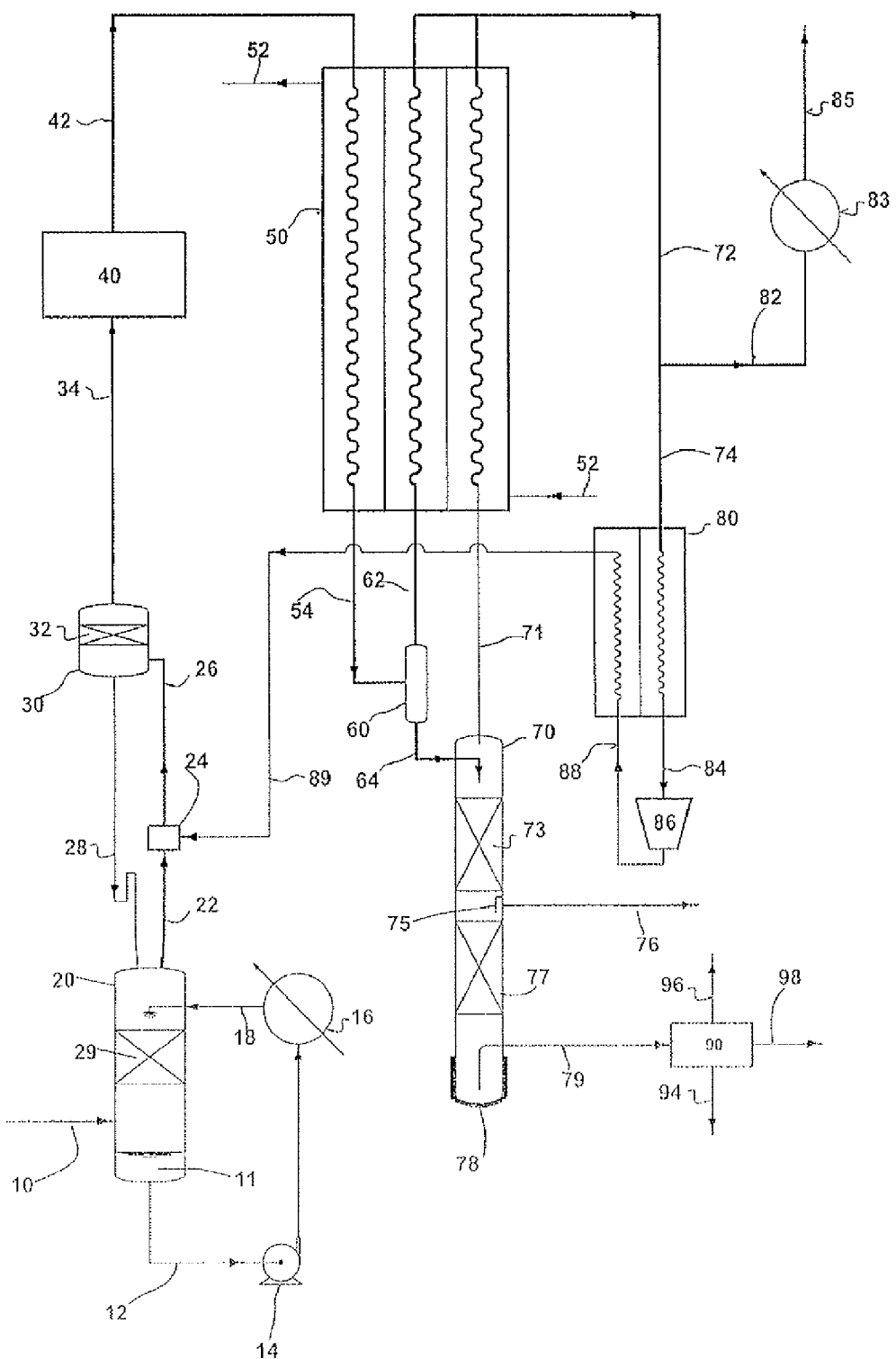
FIG. 1 illustrates a schematic diagram of a continuous process for purifying crude germanium hydride gas to obtain germanium hydrides and hydrogen substantially free of impurities in accordance with one embodiment of the present invention.

As used herein, the phrase "crude hydride gas" refers to a gaseous mixture of $GeH_4$ (germanium hydride), $Ge_2H_6$ (digermanium hexahydride), $Ge_3H_8$ (trigermane) and hydrogen having impurities. As used here, the term "impurities" refers to unwanted materials in the crude hydride gas. Impurities can include water, carbon dioxide, nitrogen, oxygen, argon, nuisance particulates from the adsorption media and germanium containing compounds other than $GeH_4$ and $Ge_2H_6$. The removal of extraneous impurities that may be contributed to the hydride gas stream by the out-gassing of polymeric gasket materials and valve trims used in plant construction is outside the scope of this invention.

With reference to FIG. 1, crude hydride gas 10, at 20° C. to 40° C. and at pressures up to 50 psia, these conditions being a preferred range, synthesized by any of the known chemical reduction methods, is fed to the wet scrubber 20. In one embodiment, the crude hydride 10 comprises a temperature of up to about 50° C. In one embodiment, the crude hydride 10 comprises a pressure of 60 psia. In one embodiment, the wet scrubber 20 comprises a vertical cylindrical vessel having a hydraulically sized mid-section fitted with a bed of commercial grade heat and mass transfer medium 29, mechanical support internals, fluid distribution means and as well as nozzles for fluid entry and exit. The amount of hydrogen in the crude hydride gas 10 can vary from under 50 mol % to over 99 mol % depending on reaction conditions. The impurities comprise mainly water and carbon dioxide in the hundreds or thousands of ppm but generally under 1% by volume where free water or aqueous media is not entrained in the feed hydride gas stream 10.

The crude hydride gas 10 enters the wet scrubber 20 below the heat and mass transfer medium and flows upwards. In one embodiments an aqueous solution 18 of an alkali metal hydroxide is fed to the wet scrubber 20 through feedline 18 at about 5° C. to about 12° C. through a liquid distributor located above the packed section 29 to provide an even distribution of liquid over the entire cross-section of the column. The relatively warm and up-flowing crude hydride gas comes into direct contact with cooler down-flowing liquid films of the hydroxide solution by which means the crude hydride gas is cooled, its water partially condensed, and $CO_2$ partially absorbed in response to lower liquid temperatures and chemically consolidated in the down-flowing aqueous hydroxide liquid. The aqueous solution 11 can comprise any suitable alkali metal hydroxide including, but not limited to potassium hydroxide, sodium hydroxide, lithium hydroxide and mixtures thereof. Advantageously, the alkali reacts with the $CO_2$ to form a soluble carbonate so that the porous heat and mass transfer medium 29 cannot plug during operation. In one embodiment, an aqueous hydroxide solution having a concentration of between 0.1M and 0.2M can be used. The de-carbonation of crude hydride gas is almost irreversible in the presence of aqueous potassium hydroxide for example, due to the liquid phase reactions:

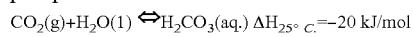
$CO_2(g) + H_2O(l) \Leftrightarrow H_2CO_3(aq.) \ \Delta H_{25°\,C.} = -20 \text{ kJ/mol}$

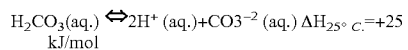
$H_2CO_3(aq.) \Leftrightarrow 2H^+(aq.) + CO_3^{-2}(aq.) \ \Delta H_{25°\,C.} = +25 \text{ kJ/mol}$

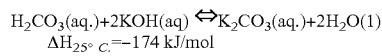
$H_2CO_3(aq.) + 2KOH(aq) \Leftrightarrow K_2CO_3(aq.) + 2H_2O(l)$
$\Delta H_{25°\,C.} = -174 \text{ kJ/mol}$ However, carbonic acid ($H_2CO_3$) is a weak acid and its low dissociation rate ultimately limits the chemical consolidation of $CO_2$ despite the increased solubility of $CO_2$ in water at lower temperatures. Germanium hydride is practically insoluble in aqueous media and was in early synthesis isolated by trapping the gas product above water columns inside inverted test tube receivers. At standard conditions, the scrubbing reactions generate heat which is for the most part carried away in the liquid phase. The flow rate of the scrubbing solution in line 18 is regulated to provide uniform wetting of the heat and mass transfer medium 29 but not at so great a rate that the pressure drop across the heat and mass transfer medium 29 approaches the hydraulic flooding limit. The volume of alkali metal hydroxide in the aqueous solution should provide adequate capacity to consume the load of carbon dioxide impurity expected in crude hydride gas over a processing cycle. The solution drains into line 12, flows to the filtered suction of a pump 14 and is circulated via the chiller 16 into the caustic feed line 18. Given this disclosure, one skilled in the art is capable of calculating the appropriate flow rates and concentration of the caustic alkali hydroxide 11 to be used.

The quantity of heat and mass transfer medium 29 in the scrubber 20 is determined to provide a sufficient bed height or number of diffusion transfer units such as to cool the incoming warm hydride gas 10 to within 1-2° C. of the temperature of incoming caustic solution 18. Consequently, in one embodiment, the first purified hydride gas 22 has a temperature of between about 6° C. and about 14° C. It is a preference of this invention that the caustic solution be maintained in a closed circulation loop, partly to conserve the active solution and partly to contain germanium hydrides that would become saturated in water due to low temperatures and higher than atmospheric pressure operation. In one embodiment, the caustic solution is contained in a closed and temperature-controlled circulation loop under the impetus of a circulating pump 14. Advantageously, heavy germanium compounds which get removed from the crude hydride gas feed 10 are recoverable from the caustic in a depressurization sequence at the end of a processing cycle. The availability of the recovery of germanium compounds is but another example of how the present invention is different from prior art purifications whereby the heavy germanium compounds are adsorbed into zeolite and subsequently purged into vent streams. The operating pressure in the wet scrubber unit 20 can range from about 35 to about 60 psia but operation between about 40 and about 60 psia is preferred.

The partially purified hydride gas 22 is then cooled abruptly to induce formation of water droplets to provide a vast interfacial area for further $CO_2$ transfer from the hydride gas into the aqueous liquid phase. In one embodiment, the partially purified hydride gas 22 leaving the scrubber 20 flows into a jet mixing nozzle 24 and combines with a hydrogen refrigerant 89 at about −50° C. to about −150° C. Mixing the hydrogen refrigerant 89 and crude hydride gas stream in a jet mixing nozzle 24 abruptly lowers the temperature of crude hydride gas, triggering homogenous condensation of water to form droplets and ice particles in the hydride gas in line 26. Water droplets formed by sub-cooling a wet gas stream in this manner are known in the art to exist in a particle size range of 0.1-40 microns. In one embodiment, the flow rate and temperature of hydrogen refrigerant in line 88 are controlled to keep the temperature of fluid in line 26 below about −2° C.

The hydride dispersion 26 comprising water droplets and ice particles in a gas continuous phase expands into a phase separator 30, which comprises a cylindrical vessel containing a disposition of fluid nozzles and an aerosol coalescing and filtration medium 32 in the upper half section. In one embodiment, the aerosol coalescing and filtration medium 32 comprises a borosilicate glass micro-fiber woven on a crimped 300 series stainless steel skeleton or nickel alloy wire for structural support, to provide a surface area per unit volume of at least 40 square inches per cubic inch. The aerosol coalescing and filtration medium 32 is mounted perpendicularly to the direction of gas passage, by which means, water droplets as small as 2 microns, come in contact with the micro-fibers, coalesce with other droplets and grow to emerge as drops on the underside of the medium. This medium also filters ice particles out of the partially purified hydride gas. In a preferred embodiment, the phase separator 30 is physically mounted above and proximally to the wet scrubber 20 so that free water collected in the phase separator 30 can drain into the absorption step 20 below.

The cooled and partially purified hydride gas 34, at about 0° C. is now substantially depleted of both carbon dioxide and water relative to the feed 10, enters the bottom of an adsorption step 40, comprising one or several cylindrical vessel(s) containing a preconditioned synthetic zeolitic molecular sieve. Pre-conditioning involves heating up a bed of zeolitic molecular sieves to about 180° C. to about 300° C. while purging it with an inert gas over 4-6 hours to desorb and remove impurities, followed by cooling the said bed to room temperature. Inert gases include but are not limited to nitrogen, argon and helium. In this invention, a hygroscopic and de-carbonating adsorbent with a narrow pore size range of 3-4 angstroms is preferred to permit selective ingress by water and carbon dioxide molecules into the larger adsorbing surface of adsorbent and to the exclusion of larger molecules (germanium hydrides). It is a preference of this invention to apply zeolite type 3A having a pore size of 3 angstroms for water (molecular diameter 3.2 Å) and carbon dioxide (molecular diameter 2.8 Å) adsorption. Other hygroscopic and clecarbonating zeolites having pore openings of about 3 to 4 angstroms can also be used.

As noted earlier, the capacity of zeolites to hold contaminants at a given pressure decreases as temperature increases and the same capacity increases as pressure increases. Adsorption is well-known exothermic phenomenon generating 1,800 BTU per pound of water adsorbed. The heat of adsorption can, for the most part, be carried out with out-flowing gas but part of the heat released tends to raise the zeolite bed temperature which in turn lowers separation efficiency. To overcome this deficiency, temperature swing adsorption unit operations typically demand higher operating pressures that increase both plant cost and the potential hazard of poison gas leaks. Hence, one advantage of the present invention is that, in one embodiment, the reduced impurity load permits the molecular sieve filled adsorption unit 40 to operate under a pressure envelope of 50 psia or less. Use of the wet chemical scrubber 20 to partially dehumidify and de-carbonate the crude hydride gas, followed by inducing homogenous condensation of moisture residue in the partially purified stream through direct mixing with hydrogen refrigerant 89 upstream of an aerosol coalescing and ice-filtering medium 32, lessens the detrimental effect of the heat of adsorption in the separation performance of the adsorption step 40. The present invention therefore provides for lower operating temperatures in the adsorption step 40 containing a zeolitic molecular sieve. Lower operating temperatures due to direct-contact chilling in step 24 and lower heat output in removing a smaller quantity of impurity render zeolitic molecular sieves in step 40 more efficient at removing water and carbon dioxide at lower operating pressures to produce drier and highly de-carbonated hydride gas, under a lower pressure ceiling.

With further reference to FIG. 1, the dry hydride gas 42 leaving the top of the adsorption step 40 contains germanium hydrides, hydrogen and trace quantities of atmospheric gases in a temperature range of 0 to 5° C. While the present invention is not restricted to the use of a specific fractionation method for separating the dry hydride gas 42, one such scheme, involving distillation will now be described with reference to FIG. 1, comprising a multi-stream heat exchanger 50 mounted over a distillation column 70 festooned with a gas-liquid separator 60 and an external reboiler heater 78. Also installed are two sections of distillation packing 73 and 77 respectively between the feed line 64 and off take 76 and between off-takes 76 and 79 as shown. The dry hydride gas 42 is passed through the heat exchanger 50 which is preferably maintained by a refrigerant circulation 52 at −155 to −160° C. by which means the hydride gas is cooled and germanium hydrides preferentially condensed and sub-cooled. The condensate formed runs down on heat transfer surfaces under the impetus of gravity and momentum of the non-condensable gas phase into line 54. The refrigerant circulation 52 can be compressed helium, hydrogen, nitrogen or halocarbon, but should provide a working temperature of at least −160° C. in the condenser 50. The multi-stream heat exchanger 50 can be a nickel-brazed plate or welded plate or other compact unit of stainless steel construction.

The two phase product stream 54 leaving the heat exchanger 50 feeds tangentially into a gas-liquid separator 60, withdrawing therefrom a gas comprised mainly of hydrogen gas 62 which returns to a channel of the heat exchanger 50 wherein germanium hydride residue is scrubbed from the out-flowing hydrogen gas 72. The separator 60 contains a coalescing pad (not shown) located above its feed point but proximally to nozzle feeding line 62, for removing entrained liquid droplets from the out-flowing gas stream 62. Saturated liquid 64, comprised principally of germane and digermane, flows from the bottom of separator 60 and enters the fractionating column 70. This liquid flows downwards as reflux to rectify an upward flowing germanium hydride gas stream from the reboiler below so as to produce an increasing concentration of digermanie in the sump of the distillation column and higher purity germane gas in the upper region of the column.

Purified germanium hydride gas 76 leaves the distillation column through a nozzle underneath the liquid deflection baffle plate 75. The theoretical purity of germane product based on partial pressures and subject to uncertainties in vapor-liquid equilibria data, is upwards of 99.94% when the distillation column 70 operates at 40 psia, which corresponds to a germane distilling temperature of about −71° C. The main impurity is digermane. In one embodiment, the bulk of the germane gas stream 76 is trapped by freezing in a receiver at −195° C. In a preferred embodiment, the germanium hydride stream 76 flows into the suction of a compressor (not shown), the discharge of which is piped to product receivers.

The buildup of digermane and other heavier components in the sump of the distillation column is controlled by bleeding off a portion of the liquid heel through line 79 into a batch separation stage 90 where mixture is separable by methods including but not limited to Rayleigh distillation, adsorption and membrane permeation, as are known by the skilled artisan, into a further germane 96 fraction, digermane 98 and heavies 94.

Now, returning to the overhead hydrogen stream 72, a portion 82 at −110 to −140° C. is further scrubbed in the condensing coils of the cryostat 83 maintained at −195° C. with liquid nitrogen to trap out residues of germanium hydride, withdrawing therefrom a purified hydrogen gas product 85 with non-condensable lights (nitrogen, oxygen and argon) which may be vented or compressed into receivers. The other portion 74 of the overhead hydrogen stream is warmed up across interchanger 80 to about −10° C. and directed to the suction of a recycle compressor 86. The compressor discharge 88 returns to the interchanger 80 wherein the compressed hydrogen gas is chilled to about −100° C. in line 89 for injection into the crude hydride gas via the jet mixer 24. In a preferred embodiment, the recycled stream 89 comprises about 20%-50% of the hydrogen in line 72.

In another embodiment of this invention, it is conceived that at shut down of the purification system, the operating pressure is gradually lowered to allow any germanium hydrides flashed off from the aqueous caustic circulation 12 to be distilled and collected. Residues of germanium hydrides solidified in the cryostatic coils of vent condenser 83, which is maintained at −195° C., are recoverable upon defrosting the unit.

Of course, many variations in the details of the illustrated embodiments will be apparent to those skilled in the art. For example, the aqueous caustic solution can be replaced with other wet scrubbing media. The scrubber 20 can be replaced with a pair of reversing heat exchangers to alternately freeze out and sublime $CO_2$ as practiced in the field of air separation and described in U.S. Pat. No. 3,967,464 to Cormier et al. Therefore, it is to be understood that the foregoing description is intended to be purely illustrative of the principles of the invention, and that the true scope of the invention is not to be limited other than as expressly set forth in the appended claims. While this invention has been particularly shown and described with reference to preferred embodiments it will be understood by those skilled in the art that various changes in form and detail may be made therein without departing from the spirit and scope of the invention.

What is claimed is:

1. A method of purifying germanium hydrides from crude hydride gas (10), said method comprising the sequential steps of:
   a) providing a crude hydride gas feed (10) having impurities, wherein said impurities comprise water, carbon dioxide and quantities of air constituents;
   b) forming a partially purified hydride gas (22) having a lower concentration of water and carbon dioxide by contacting said crude hydride gas feed (10) with a cold aqueous caustic solution (18), thereby partially removing impurities;
   c) chilling said partially purified hydride gas (22) below about −2° C. through direct-contact with hydrogen gas refrigerant at about −50° C. to about −150° C. to produce a dispersion (26) of liquid droplets and ice particles in a hydride gas continuous phase, said liquid droplets providing an interfacial area for further dissolution of carbon dioxide from the gas phase;
   d) separating the liquid and ice particles from the hydride gas across a coalescing and filtration medium (32), withdrawing therefrom a cooled and partially purified hydride gas (34); and
   e) forming a dry hydride gas (42) comprising hydrogen and germanium hydrides by passing said cooled and partially purified hydride gas (34) through a molecular zeolitic sieve (40).

2. The method of claim 1 wherein said caustic comprises an aqueous solution of alkali metal hydroxide at feed temperatures below about 12° C.

3. The method of claim 1 wherein said caustic at step b) comprises a caustic selected from potassium hydroxide, sodium hydroxide, lithium hydroxide, or mixtures thereof.

4. The method of claim 1 wherein at least a portion of said hydrogen refrigerant (89) originates from a hydrogen gas refrigerating sub-system comprising a compressor (86) for compressing a portion (74) of a scrubbed hydrogen gas stream (72), and an interchanger (80) for simultaneously warming up the said feed to compressor (84) and chilling the compressed hydrogen gas stream (88).

5. The method of claim 1 wherein the aerosol coalescing medium (32) at step d) comprises a 300 series stainless steel or nickel alloy wire/fiberglass co-knit mesh with a surface area per unit volume of at least 40 square inches per cubic inch.

6. The method of claim 1 wherein the water formed from droplets and thawing ice particles collected by the aerosol coalescing medium (32) is optionally returnable to the top of a wet scrubber (20).

7. The method of claim 1 wherein said molecular zeolitic sieve (40) at step e) comprises a zeolite having a nominal pore size of 3 angstroms to selectively adsorb water and carbon dioxide contained in said cooled and partially purified hydride gas (34).

8. The method of claim 1 wherein said molecular zeolitic sieve (40) at step e) comprises a synthetic molecular sieve having pore openings in the range of 3-4 angstroms and having molecular sieving properties typical of synthetic zeolite type 3A.

9. The method of claim 1 further comprising the step of:
f) partially condensing said dry hydride gas (42) in a multi-channel condenser (50) maintained below about −160° C. by a refrigerant circulation (52) thereby condensing and subcooling germanium hydrides in hydrogen gas to form a two-phase gas-liquid product stream (54).

10. The method of claim 9 further comprising the step of
g) expanding said two-phase product stream (54) into a gas-liquid separator (60), withdrawing therefrom a gas phase (62) that is further scrubbed of its residual germanium hydride content across a passage of the multi-channel condenser (50), and further withdrawing a liquid phase (64) from the bottom of the gas-liquid separator (60).

11. The method of claim 10 further comprising the step of
h) feeding said liquid phase (64) from said gas-liquid separator (60) into a distillation system and withdrawing therefrom separate streams of purified germanium hydride gas and enriched digermanium hexahydride liquid.

12. A method of purifying germanium hydrides from crude hydride gas (10), said method comprising the sequential steps of:
a) providing a crude hydride gas feed (10) having impurities, wherein said impurities comprises water, carbon dioxide and quantities of air constituents;
b) forming a partially purified hydride gas (22) by contacting said crude hydride gas feed with a caustic having a caustic feed temperature of between about 5° C. and about 12° C. thereby removing impurities;
c) cooling said partially purified hydride gas (22) through direct-contact with hydrogen refrigerant (89) having a temperature of at least −20° C. to trigger homogenous condensation of water droplets thereby forming a hydride dispersion (26); and
d) passing said hydride dispersion (26) having a dispersion of water droplets and/or ice particles across an aerosol coalescing and filtration medium (32) to remove said water droplets and/or ice particles thereby making a cooled and partially purified hydride gas (34); and
e) forming a dry hydride gas (42) comprised essentially of hydrogen and germanium hydrides by passing said cooled and partially purified hydride gas (34) through a zeolitic molecular sieve (40).

13. The method of claim 12 wherein said hydrogen refrigerant (89) comprises a recycled stream.

* * * * *